Sept. 29, 1964    J. C. MULLER    3,150,768
DRIVE UNIT CONSTRUCTION FOR CONVEYORS
Filed March 12, 1962    2 Sheets-Sheet 1
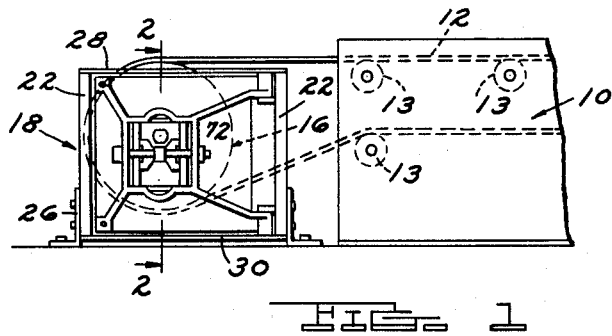
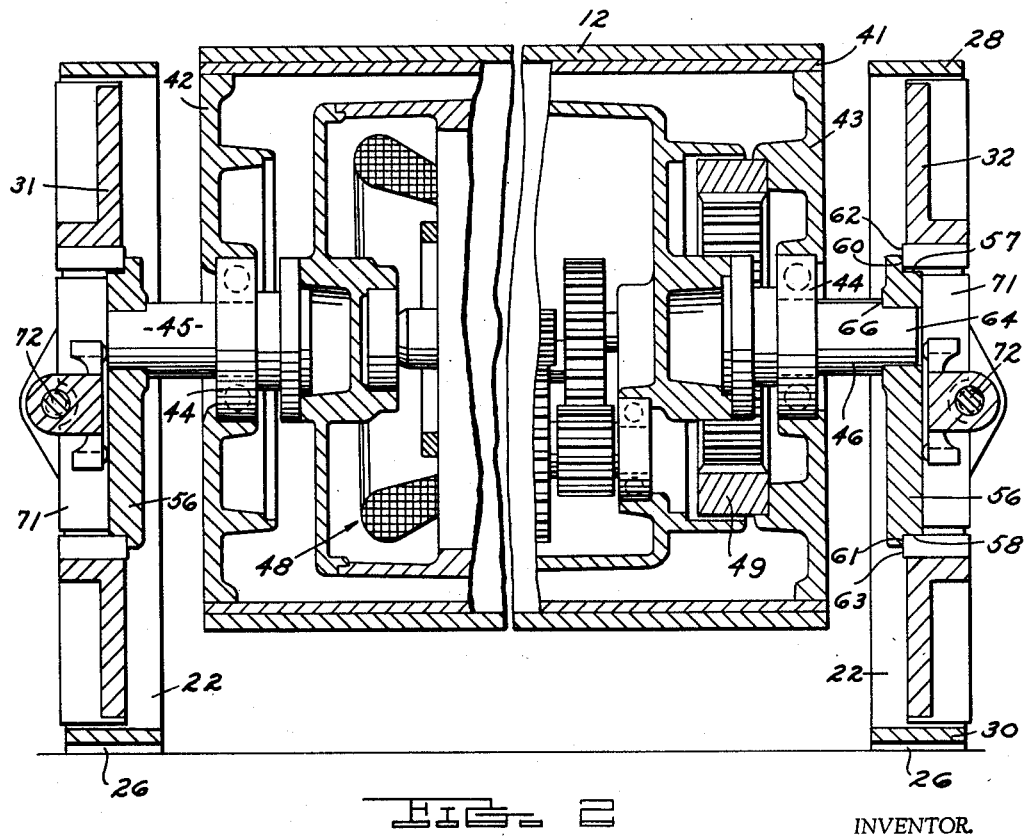
INVENTOR.
JEAN C. MULLER
BY Farley, Forster and Farley
ATTORNEYS Sept. 29, 1964     J. C. MULLER     3,150,768
DRIVE UNIT CONSTRUCTION FOR CONVEYORS
Filed March 12, 1962     2 Sheets-Sheet 2
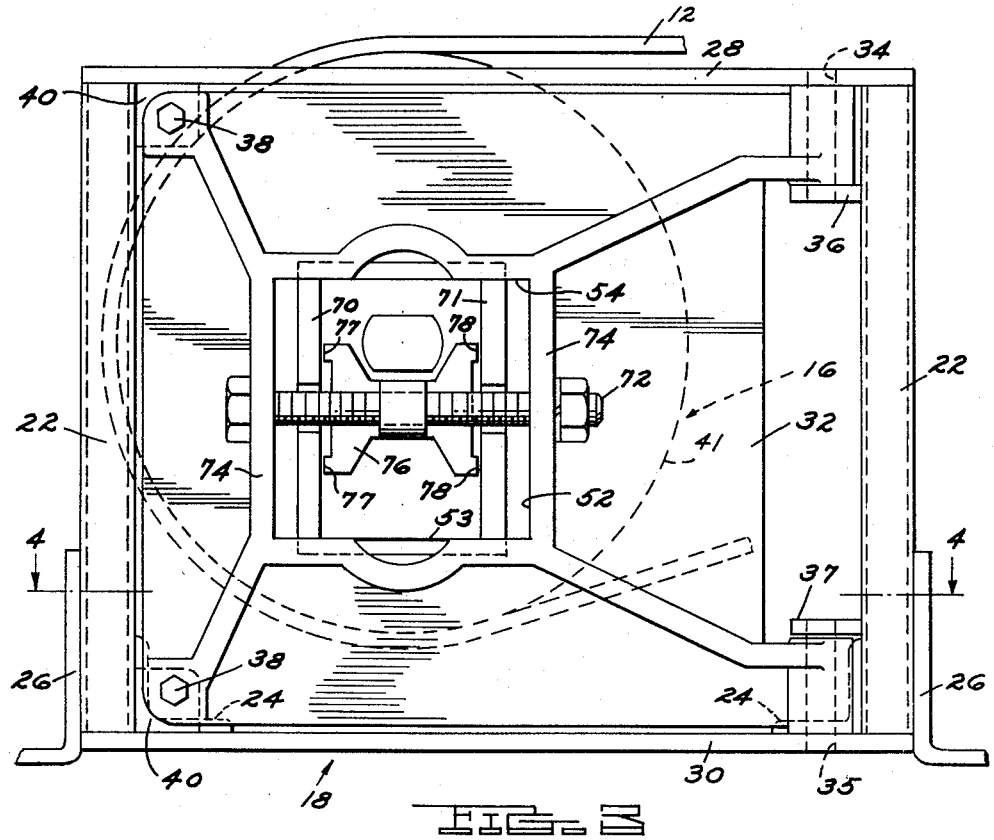
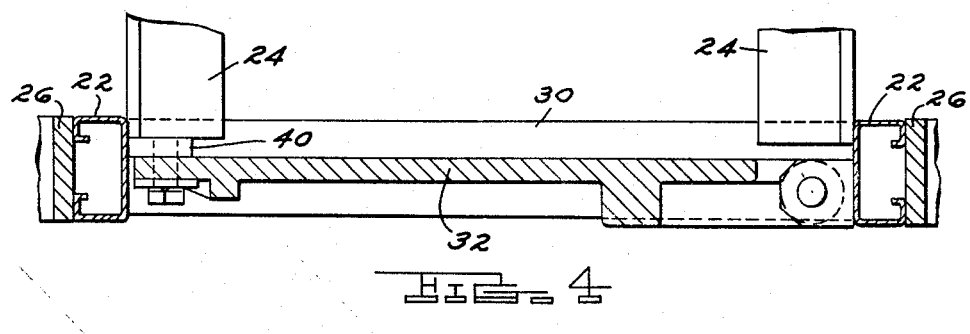
INVENTOR.
JEAN C. MULLER
BY Farley, Forster and Farley
ATTORNEYS

United States Patent Office 3,150,768
Patented Sept. 29, 1964

3,150,768
DRIVE UNIT CONSTRUCTION FOR CONVEYORS
Jean C. Muller, Downey, Calif., assignor to Jervis B. Webb Company, Detroit, Mich., a corporation of Michigan
Filed Mar. 12, 1962, Ser. No. 179,536
10 Claims. (Cl. 198—203)

This invention relates to improvements in the construction of a drive unit for a conveyor, particularly a conveyor of the belts, live roller or accumulation type.

The general objects of these improvements are to provide a unit in which a driving element, such as a motorized pulley, is mounted so as to be readily removable for replacement or repair; to provide a drive unit in which the axis of rotation of the driving element can readily be adjusted in directions such as to properly train the endless conveyor member about the drive element and to take up any slack which may normally exist in the endless conveyor member; and to provide a drive unit, particularly suitable for belt type conveyors, which is very compact and designed to employ a motorized pulley which can be quickly removed as a unit and replaced by another one whenever necessary to provide a speed change in the conveyor, to correct a malfunction, or any other reason. This ease of removal and replacement results in part from the improved mounting provided for a motorized pulley which permits the pulley axle position to be readily adjusted both to take up any slack in the belt, and to place the pulley axis of rotation in proper transverse relation to the path of belt travel in order that the belt will be properly trained about the pulley—that is, will travel in centered relation on the pulley as the latter revolves.

The improved drive unit construction of the invention consists of suitable frame structure, a driving element—preferably a motorized pulley—about which an endless conveyor member is adapted to be trained and which includes an axle at each end thereof, and a frame end member located adjacent each end of the pulley axle. At least one of these frame end members is pivotally secured to the frame structure by suitable hinge means for swinging movement between closed and open positions, and when in closed position extends parallel to the other frame end member and transverse to the pulley axle. Means are provided for mounting the pulley axle between the frame end members for adjusting movement in directions longitudinally and transverse of the path of travel of the conveyor member, and in the case of the frame end member which is hinged to the frame, these mounting means include a pulley axle mounting plate slidably and detachably engaging the inner face of the swinging frame end member, means securing the pulley axle to this mounting plate, and pulley axle adjusting means which include a motion transmitting member detachably engaging the pulley axle mounting plate. Suitable adjusting means are provided on the other frame end member with the adjusting means on the end members being individually operable.

Preferably, both frame end members are hinged to the frame and held in position by suitable locking bolts so that the motorized pulley is accessible from either side of the drive unit. When a swinging end plate is unlocked from the frame and opened, the driving member or motorized pulley is detached from the frame structure merely by movement relative thereto.

Other preferred features and advantages will appear in the following description of the presently preferred representative embodiment of the invention disclosed in the accompanying drawings which consists of the following views:

FIGURE 1, an elevation showing one end of a belt conveyor with a drive unit of the invention installed thereon;

FIGURE 2, an enlarged transverse sectional elevation taken through the drive unit as indicated by the line 2—2 of FIG. 1;

FIGURE 3, an enlarged side elevation of the drive unit shown in FIG. 1; and

FIGURE 4, a fragmentary sectional plan view taken as indicated by the line 4—4 of FIG. 3.

In FIG. 1, the belt conveyor shown includes suitable supporting structure 10, an endless conveyor member or belt 12 supported by idler rollers 13 and trained about the driving element or pulley 16 of a drive unit 18 constructed in accordance with the invention.

The drive unit has suitable frame structure including upright corner members 22, side members 24, mounting brackets 26 and a pair of upper and lower bars 28 and 30 at each end, connected to the corner and side members.

In the construction shown, identical end plates 31 and 32 are provided at each end of the frame. Each of these end plates is mounted between the upper and lower fixed end bars 28 and 30 for swinging movement on hinge pins 34 and 35, hinge pin 34 being carried by upper frame bar 28 and a bracket 36 secured to a corner post 22, and hinge pin 35 being similarly mounted between the lower frame bar 30 and a bracket 37. This hinge mounting of each end plate permits it to be swung between closed and open positions, closed position being defined by locking bolts 38 which extend through the end plate and engage brackets 40 secured to a corner post 22.

The driving element shown consists of a motorized pulley best illustrated in FIG. 2. It includes an outer cylindrical shell 41, about which the belt 12 is trained, having end members 42 and 43 rotatably mounted on bearings 44 on pulley axle members 45 and 46. These axle members are non-rotating. They support an encased motor 48, which through suitable gearing drives an internal gear 49 secured to the pulley end member 43.

The motorized pulley is mounted between the frame end plates 31 and 32 for adjusting movement relative to the path of travel of the conveyor belt, these mounting means being such as to permit the motorized pulley to be readily removed from the frame structure and the axis of pulley rotation to be adjusted relative to the path of belt travel. For each of the swinging end plates 31 and 32, but referring to plate 32, the pulley mounting and adjusting means includes an aperture 52 formed in the end plate and having a pair of parallel guide surfaces 53 and 54. A pulley axle mounting plate 56 is slidably mounted in the aperture 52 of the end plate 32, being provided with parallel guide surfaces 57 and 58 and abutment surfaces 60 and 61 which engage complementary abutment surfaces 62 and 63 formed on the inner face of the end plate 32 adjacent to the guide surfaces 53 and 54 thereof. The axle mounting plate 56 non-rotatably engages the pulley axle 46, the axle being provided with a reduced non-circular end portion 64 which is received in a complementary shaped aperture in the mounting plate 56 to a limit defined by the shoulder 66 between the reduced axle portion and remaining portion thereof. The axle mounting plate 56 includes a pair of spaced flanges 70 and 71 (FIG. 3) which project through the aperture 52 in the end plate 30 and will be termed motion transmitting surfaces or means.

The adjusting means for varying the position of the pulley axle includes a threaded adjusting bolt 72 mounted between a pair of externally projecting boss portions 74 on the outer face of the end plate and extending across the aperture 52 thereof in parallel relation to the guide surfaces 53 and 54. A motion transmitting, or pusher member, 76 is threadedly engaged by the bolt 72, this member 76 including a pair of motion transmitting portions 77 and a second pair of motion transmitting portions 78. Portions 77 and 78 lie between and adjacent to the motion transmitting flanges 70 and 71 of the axle mounting plate 56.

While a similar mounting and adjusting means are shown and preferred for the end plate 31, in actual practice it would not be necessary to employ exactly the same parts because one of the end plates can optionally be fixed rather than hinged to the frame. In such case, all that would be necessary would be to provide some means for slidably supporting the end of the pulley axle member 45 on the fixed end plate, for adjusting its position independently of the position of the axle member 46 at the other end of the motorized pulley unit, and for detachably engaging the pulley axle 45 with this mounting and adjusting means so that the pulley unit could be withdrawn through the end plate 32 when swung to open position. Preferably the end plates will be the same since this not only permits standardization of parts but also permits the motorized pulley unit to be accessible for removal and replacement from either end of the frame structure.

In the installation of a motorized pulley unit in the drive unit frame, assuming end plate 32 is open, the pulley unit is first placed between the upper and lower runs of the belt 12, axle 45 is inserted within the mounting plate 56, and the later placed in abutting engagement with the guide and abutment surfaces on the end plate 31. With swinging end plate 32 in its open position, the other axle mounting plate 56 can readily be slipped onto the end of the pulley axle 46 and with the pulley held in proper position, the swinging end plate 32 can be closed and the locking bolts 38 tightened to take up any transverse clearance and place the pulley axle mounting plates 56 in snug but sliding engagement with the guide and abutment surfaces of the end plates 31 and 32. Prior to this assembly operation, the pusher members 76 will be moved to a slack position by turning the adjusting bolts 72 thus making it easy to place the motorized pulley in the belt and in the drive unit frame. With the pusher member 76 in proper position it will be seen that as the swinging end plate 30 is moved from open to closed position the axle mounting plate 56 will be self-engaging not only in guiding and abutting relation to the end plate but also in driving relation with the motion transmitting surfaces of the pusher member 76.

Once the motorized pulley has been mounted, slack is taken out of the belt by adjusting both of the adjusting bolts on the end plates 28 and 30 and the conveyor operated. If the transverse relation of the motorized pulley axle to the direction of travel of the belt is not proper, the belt will tend to creep towards one end of the pulley or the other. In such case the pulley axle can easily be adjusted to compensate for and eliminate this creep by changing, through the adjusting bolts 72, the position of either the axle member 45 or the axle member 46 or both of them as may be required. This adjustment, which is usually a relatively difficult and time consuming task with conventionally mounted driving pulleys, can be made in a few minutes.

If it should become necessary to replace a motorized pulley, the lock bolts 38 of one of the end plates are loosened, and with the pulley unit and belt manually supported, the end plate can easily be swung to open position. As this swinging movement takes place the axle mounting plate 56 is disengaged both from the pusher member 76 of the adjusting means and from the guide and abutment surfaces on the end plate.

The ease with which a motorized pulley driving element can be removed and replaced in the frame structure of the drive unit, and adjusted in proper driving relation with the endless conveyor element is a great advantage, particularly in the field of belt conveyors. Where the belt driving pulley is supported in conventional bearings, the operation of belt training is often a time consuming and difficult one as previously mentioned. Where a speed change in the conveyor is desirable it becomes practical to obtain this speed variation by changing the driving unit whereas formerly this would not ordinarily be considered practical. Instead, if a change of speed were contemplated a more costly variable speed type of driving unit would be employed in the original installation. In case of malfunction or maintenance requirements, the amount of conveyor downtime is minimized since the trouble can ordinarily be corrected simply by removing one motorized pulley unit and replacing it with a properly functioning one.

While preferred embodiments have been described above in detail, it will be understood that numerous modifications might be resorted to without departing from the scope of the invention as defined in the following claims.

I claim:
1. A drive unit construction for an endless conveyor member such as a belt comprising
   (a) frame structure
   (b) a motorized pulley about which said endless member is adapted to be trained, said motorized pulley including an axle extending from each end thereof,
   (c) said frame including an end member adjacent each end of said motorized pulley axle, means pivotally securing at least one of said end members to said frame for swinging movement on an axis disposed in transverse spaced relation to said pulley axle, means for detachably securing said one end member to said frame against such swinging movement in a closed position extending substantially parallel to the other of said end members,
   (d) means mounting said pulley axle on said end members for adjusting movement relative to the path of travel of said conveyor member, said mounting means including a pulley axle mounting plate slidably and detachably engaging the inner face of said one end member in the closed position thereof, means for securing said pulley axle to said mounting plate, and
   (e) pulley axle adjusting means carried on each of said end members, said adjusting means including a motion transmitting member on said one end member detachably engaging said mounting plate,
   (f) said pulley axle mounting plate being disengaged from said one end member and from said motion transmitting member upon movement of said one end member out of the closed position thereof.

2. A drive unit according to claim 1 wherein said one frame end member is provided with a pair of spaced parallel guide surfaces extending substantially longitudinal of the path of travel of said endless conveyor member when said one frame end member is in closed position, abutment surfaces on said one frame end member extending normal to said pulley axle when said one end member is in closed position, said pulley axle mounting plate having surfaces which slidably engage said guide and abutment surfaces.

3. A drive unit construction according to claim 2 wherein said one frame end member is provided with an aperture intermediate said pair of guide surfaces thereof, said motion transmitting member and said mounting plate being provided with means located in said aperture for transmitting movement of said adjusting means and motion transmitting member to said mounting plate.

4. A drive unit construction according to claim 1 wherein said one frame end member is provided with an aperture having a pair of parallel guide surfaces on opposite edges thereof, an abutment surface on the inner face of said one end member adjacent each of said guide surfaces, said guide surfaces extending longitudinal of the path of travel of said endless conveyor member when said one end member is in closed position, said pulley axle mounting plate being provided with surfaces engageable with said guide and abutment surfaces, said pulley axle mounting plate having two-way motion transmitting means projecting through said aperture for detachable engagement by complementary means on said motion transmitting member when said one end member is in closed position.

5. A drive unit according to claim 4 wherein the adjusting means on said one end member comprises a threaded member extending across said aperture parallel to said guide surfaces thereof, said threaded member threadedly engaging said motion transmitting member.

6. A drive unit construction according to claim 1 further including means for slidably and non-rotatively securing said pulley axle in said mounting plate, and means for axially locating said pulley axle relative to said mounting plate.

7. A drive unit construction for an endless conveyor member such as a belt comprising
   (a) frame structure
   (b) a motorized pulley about which said endless member is adapted to be trained, said motorized pulley including an axle extending from each end thereof,
   (c) said frame including a pair of end plates adjacent the ends of said pulley axle, means pivotally securing each of said end plates to said frame for swinging movement between closed and open positions on an axis spaced laterally of the pulley axle by a distance greater than the pulley radius, locking means for securing each of said end plates in closed position,
   (d) means for mounting said pulley between said end plates comprising an aperture formed in each end plate and having a pair of parallel guide surfaces defining opposite sides thereof, an abutment surface formed on the inner face of each end plate adjacent each of said guide surfaces, a pulley axle mounting plate having guide and abutment surfaces engageable with the corresponding surfaces of an end plate, means including a radial abutment surface for locating each end of said pulley axle in one of said axle mounting plates whereby said radial abutment surface and the abutment and guide surfaces between said mounting plates and end plates are held in engagement when said end plates are moved to locked in closed position and
   (e) adjusting means carried by each of said frame end plates for moving each axle mounting plate independently along the guide and abutment surfaces which it engages,
   (f) each of said axle mounting plates being disengaged from its respective end plate and adjusting means by swinging movement of such end plate out of the closed position thereof.

8. A drive unit according to claim 7 wherein said adjusting means includes a rotatable adjusting member carried on the outer face of each end plate and extending across said aperture in parallel relation with the guide surfaces thereof, a pusher member threadedly engaging said adjusting member, and interengaging surface means between said pusher member and axle mounting plate disengageable by movement of the end plate to open position.

9. A driving unit for an endless conveyor member such as a belt comprising frame structure, pulley means engageable with said conveyor endless member and having an axle member at each end thereof, said frame including a pair of spaced parallel end members extending transversely to said axle members adjacent the ends thereof, means connecting at least one of said end members to said frame structure for movement relative to the other of said end members, an axle mounting member slidably carried by each of said frame end members for movement in a direction generally parallel to the path of travel of said conveyor member, adjusting means mounted on each of said frame end members, said adjusting means engaging and fixing the location of said axle mounting member relative to said frame member on which the axle member is carried whereby the position of each axle member may be independently adjusted relative to said path of travel, and means detachably connecting said axle mounting member to said one movable frame end member and to the said adjusting means mounted thereon for disengagement therefrom by movement of said one frame end member relative to the other frame end member.

10. A drive unit for an endless conveyor member such as a belt comprising a frame having at least one open end and a pair of spaced parallel end members, a driving pulley including axle means, means attaching one of said end members to said frame at the open end thereof for movement between open and closed positions, means for normally retaining said one end member in said closed position, and means for mounting said driving pulley between said end members, said mounting means including a pulley axle mounting member slidably engaging said one end member in the closed position thereof for movement in a direction transverse to the pulley axle, adjusting means carried by said one end member, said adjusting means engaging and fixing the location of said axle mounting member and means detachably connecting the axle mounting member to said one movable frame member and to said adjusting means for disengagement therefrom upon movement of the one frame member out of its closed position.

References Cited in the file of this patent
UNITED STATES PATENTS

| | | |
|---|---|---|
| 1,558,300 | Searles | Oct. 20, 1925 |
| 1,756,782 | Burnett | Apr. 29, 1930 |
| 2,915,167 | Berger | Dec. 1, 1959 |